US009807342B2

United States Patent
Fogarty et al.

(10) Patent No.: US 9,807,342 B2
(45) Date of Patent: *Oct. 31, 2017

(54) COLLABORATIVE PRESENTATION SYSTEM

(71) Applicant: Microsoft Technology Licensing, LLC, Redmond, WA (US)

(72) Inventors: John P. Fogarty, West Linn, OR (US); Benjamin Clifton, Oregon, OR (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/269,361

(22) Filed: Sep. 19, 2016

(65) Prior Publication Data
US 2017/0006260 A1 Jan. 5, 2017

Related U.S. Application Data

(63) Continuation of application No. 14/639,538, filed on Mar. 5, 2015, now Pat. No. 9,449,414.

(51) Int. Cl.
*H04N 7/14* (2006.01)
*G06T 3/40* (2006.01)
(Continued)

(52) U.S. Cl.
CPC ............ *H04N 7/147* (2013.01); *G06T 3/40* (2013.01); *G06T 11/60* (2013.01); *H04L 65/403* (2013.01);
(Continued)

(58) Field of Classification Search
USPC .......... 348/14.01, 14.03, 14.07, 14.12, 14.08
See application file for complete search history.

(56) References Cited

U.S. PATENT DOCUMENTS 5,915,091 A * 6/1999 Ludwig .................. G06Q 10/10
348/E7.081
6,134,346 A 10/2000 Berman et al.
(Continued)

FOREIGN PATENT DOCUMENTS

EP 2498237 A2 9/2012
WO 2014020364 A1 2/2014

OTHER PUBLICATIONS

Apperley, M. et al., "Use of Video Shadow for Small Group Interaction Awareness on a Large Interactive Display Surface," Proceedings of the Fourth Australasian User Interface Conference (AUIC2003), vol. 18, Feb. 1, 2003, Adelaide, Australia, 10 pages.
(Continued)

*Primary Examiner* — Olisa Anwah
(74) *Attorney, Agent, or Firm* — Alleman Hall Creasman & Tuttle LLP

(57) ABSTRACT

Embodiments of collaborative presentation systems are provided. An example collaborative presentation system includes a display device, an image sensor, a network interface, a logic device, and a storage device holding instructions executable by the logic device to retrieve a presentation file that is executed to display a presentation on the display device, receive image frames from the image sensor, the image frames including the display device, the displayed presentation, and a presenter, and extract the presenter from the image frames to generate an extracted presenter image. The instructions are further executable to adjust an appearance of the extracted presenter image to form an adjusted presenter image, generate an updated presentation file, the updated presentation file being executable to display the presentation overlaid with the adjusted presenter image, and transmit, via the network interface, the
(Continued)

updated presentation file to a remote presentation participant device.

19 Claims, 7 Drawing Sheets

(51) Int. Cl.
| | |
|---|---|
| *G06T 11/60* | (2006.01) |
| *H04L 29/06* | (2006.01) |
| *H04N 13/00* | (2006.01) |
| *H04N 13/02* | (2006.01) |
| *H04M 3/56* | (2006.01) |
| *H04N 7/15* | (2006.01) |
| *G06K 9/00* | (2006.01) |

(52) U.S. Cl.
CPC ........ *H04L 65/4015* (2013.01); *H04L 65/601* (2013.01); *H04M 3/567* (2013.01); *H04N 7/141* (2013.01); *H04N 7/15* (2013.01); *H04N 13/0059* (2013.01); *H04N 13/0203* (2013.01); *H04N 13/0257* (2013.01); *H04N 13/0296* (2013.01); *G06K 9/00362* (2013.01); *G06T 2200/24* (2013.01); *G06T 2210/22* (2013.01)

(56) References Cited

U.S. PATENT DOCUMENTS

| | | | |
|---|---|---|---|
| 8,007,110 B2 | 8/2011 | Dunn et al. | |
| 8,013,873 B2 | 9/2011 | Barenbrug et al. | |
| 8,300,890 B1 | 10/2012 | Gaikwad et al. | |
| 8,520,027 B2 | 8/2013 | Itkowitz et al. | |
| 8,774,267 B2 | 7/2014 | Gaddy et al. | |
| 8,786,631 B1 | 7/2014 | Collins | |
| 9,088,688 B2 | 7/2015 | Krans et al. | |
| 9,118,804 B2 * | 8/2015 | Kim ........................ | H04N 7/147 |
| 9,270,933 B1 | 2/2016 | Jiang | |
| 2008/0184124 A1 | 7/2008 | Agarwal et al. | |
| 2010/0253850 A1 | 10/2010 | Cooper et al. | |
| 2010/0315510 A1 | 12/2010 | Dunn et al. | |
| 2011/0304706 A1 | 12/2011 | Border et al. | |
| 2012/0051631 A1 | 3/2012 | Nguyen et al. | |
| 2013/0188094 A1 | 7/2013 | Samadani et al. | |
| 2014/0104363 A1 | 4/2014 | Clapis et al. | |
| 2014/0272336 A1 | 9/2014 | Lenhard et al. | |
| 2015/0029294 A1 * | 1/2015 | Lin ........................ | H04N 7/141 |
| | | | 348/14.01 |

OTHER PUBLICATIONS

Friedland, G. et al., "Human-Centered Webcasting of Interactive-Whiteboard Lectures," Proceedings of the Eighth IEEE International Symposium on Multimedia (ISM'06), Dec. 11, 2006, San Diego, California, 6 pages.

Crabb, R. et al., "Real-time Foreground Segmentation via Range and Color Imaging," Proceedings of the IEEE Computer Society Conference on Computer Vision and Pattern Recognition Workshops (CVPRW '08), Jun. 23, 2008, Anchorage, Alaska, 5 pages.

Ikemura, S. et al., "Real-Time Human Detection using Relational Depth Similarity Features," Proceedings of the 10th Asian Conference on Computer Vision (ACCV 2010), Springer LNCS vol. 6495, Nov. 8, 2010, Queenstown, New Zealand, 14 pages.

ISA European Patent Office, International Search Report and Written Opinion Issued in Application No. PCT/US2016/017049, Apr. 22, 2016, WIPO, 15 pages.

U.S. Notice of Allowance Issued in U.S. Appl. No. 14/639,538, dated May 23, 2016, 6 pages.

* cited by examiner

COLLABORATIVE PRESENTATION SYSTEM

CROSS REFERENCE TO RELATED APPLICATIONS

This application is a continuation of U.S. patent application Ser. No. 14/639,538, filed on Mar. 5, 2015, and titled "COLLABORATIVE PRESENTATION SYSTEM," the entire disclosure of which is hereby incorporated herein by reference.

BACKGROUND

Presentations may be displayed to both local and remote participants. For example, local participants may share a presentation environment with a presenter, while remote participants are located in different environments.

SUMMARY

Embodiments of collaborative presentation systems are provided. An example collaborative presentation system includes a display device, an image sensor, a network interface, a logic device, and a storage device holding instructions. The instructions are executable by the logic device to retrieve a presentation file that is executed to (i) display a presentation on the display device; (ii) receive image frames from the image sensor, the image frames including the display device, the displayed presentation, and a presenter; and (iii) extract the presenter from the image frames to generate an extracted presenter image. The instructions are further executable to (i) adjust an appearance of the extracted presenter image to form an adjusted presenter image; (ii) generate an updated presentation file, the updated presentation file being executable to display the presentation overlaid with the adjusted presenter image; and (iii) transmit, via the network interface, the updated presentation file to a remote presentation participant device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As described above, local participants may share a presentation environment with a presenter, allowing the local participants to view the presenter's interactions with a presentation displayed on a display device. In some presentation systems, remote participants may access only the presentation file that is executed to display the presentation on the display device in the presentation environment. For example, slides of a presentation that are displayed in the presentation environment may also be displayed at a remote device. However, in such systems, the remote participant is not able to see the presenter's interactions with the displayed presentation. In other systems, a video of the presentation environment may be made available at the remote device. However, if the video capture is focused on the presenter, the displayed presentation may be difficult or impossible to distinguish at the remote computing device. For example, displayed text may be "washed out" by the exposure level used to appropriately capture the presenter. The resolution of a video capture device (e.g., and RGB camera) may also be too low to capture the information on the display in detail. Alternatively, a video capture that is optimized for capturing the displayed presentation may blur out or otherwise disrupt the clarity of the presenter (e.g., such that certain body movements or facial expressions are not distinguishable). Body language and facial expressions of the presenter may provide additional information to participants, even when the presenter is not directly interacting with the displayed presentation. Therefore, any obfuscation of said characteristics may detract from a participant's presentation experience. Furthermore, while local participants may be able to adjust positions to see portions of a display that are obscured (e.g., temporarily) by the presenter, remote participants that rely on a video capture may be limited to the single viewpoint provided by the imaging device.

In order to address the above issues, the disclosure provides collaborative presentation systems and methods that allow remote participants to view a modified version of the presentation file that the local participants of a presentation view. The modified version of the presentation file may overlay an image of the presenter over the presentation (e.g., as a live or recorded feed of the presenter taken over the course of the presentation). The image of the presenter may be adjusted (e.g., a transparency of the presenter may be increased) in order to reduce obscuring effects of the presenter over the displayed presentation. In this way, utilizing the collaborative presentation systems and methods described herein, remote participants may view a presentation having the same quality as the presentation viewed by local participants, while also viewing body language, gestures, and/or facial expressions of the presenter that enhance the presentation.

Figure 1:
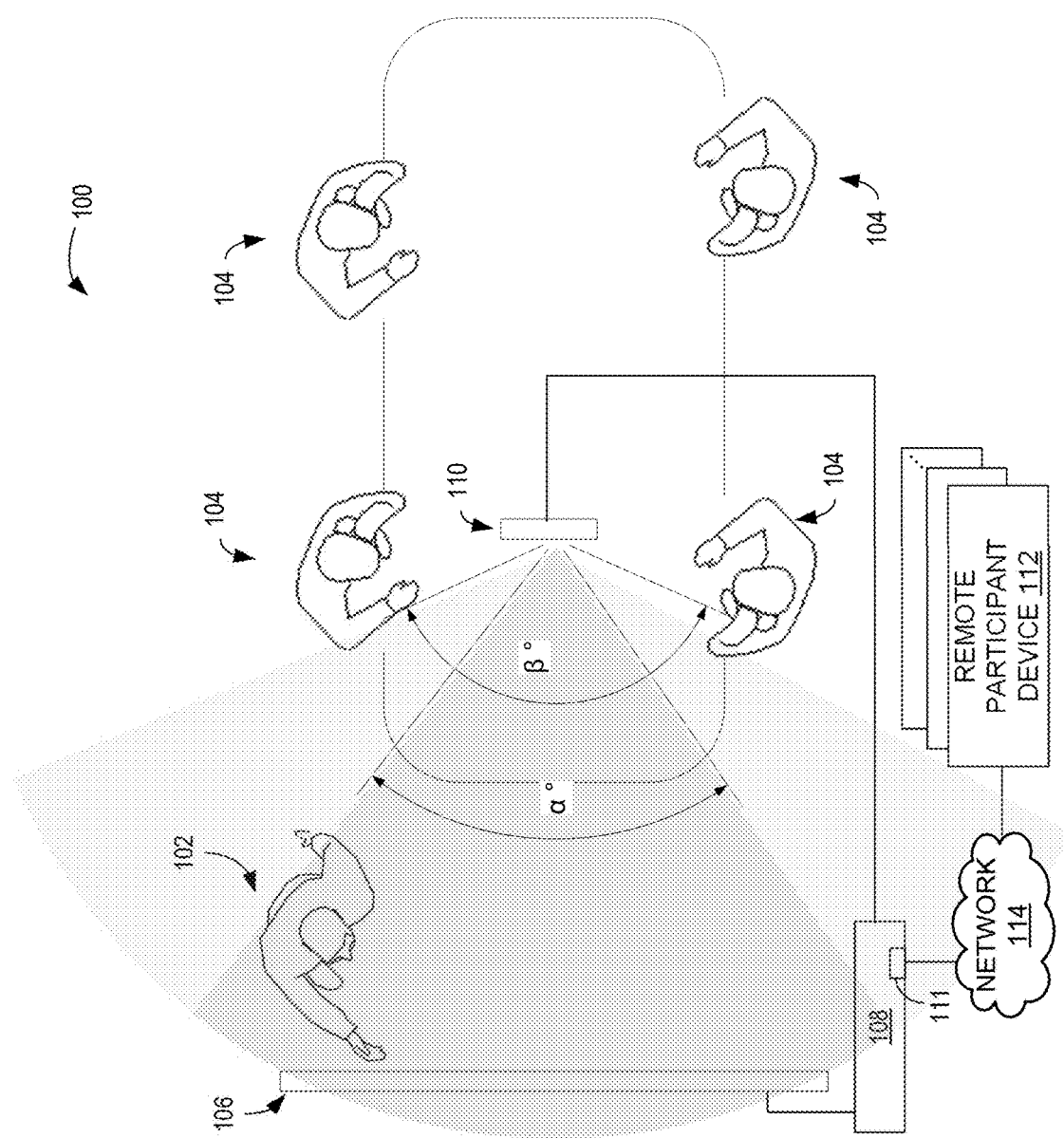
FIG. 1 shows an example presentation environment.

FIG. 1 shows an example presentation environment 100. The illustrated presentation environment includes a presenter 102, a plurality of local participants 104, and a display device 106 on which a presentation may be displayed. A computing device 108 may be coupled to display device 106 (e.g., directly, as illustrated in FIG. 1, and/or indirectly, though a network and/or other computing device) in order to provide display data configured to control the display device to display a presentation. For example, the computing device 108 may retrieve and execute a presentation file in order to generate the display data that is sent to the display device for displaying the presentation.

An image sensor 110 may also be coupled to computing device 108 (e.g., directly, as illustrated in FIG. 1, and/or indirectly, through a network and/or other computing device). Image sensor 110 may be configured to capture image frames that include at least a portion of the display device 106 and at least a portion of the presenter 102 (e.g., positioned such that a field of view of the camera includes the display device and the presenter). It is to be understood that the presenter may move during the presentation. Therefore, the image sensor 110 may be controlled to track and follow the location of the presenter and/or be directed such that the sensor is able to image a periphery of the display (e.g., a location at which a presenter is likely to occupy while interacting with the presentation). The image sensor 110 may transmit image frames including the presenter, the display device, and/or other elements in the presentation environment/within a field of view of the image sensor to the computing device 108 for processing (examples of which are described in more detail below).

Image sensor 110 may include any suitable imaging device and/or combination of imaging devices. For example, image sensor 110 may include an RGB camera configured to have a field of view ($\beta$) that is configured and/or sized/positioned to capture the presenter and display in the room context. In some examples, the RGB camera may have a field of view of approximately 150 degrees. In other examples, image sensor 110 may include a plurality of RGB cameras configured to have a combined field of view of approximately 150 degrees. It is to be understood that image sensor 110 may include one or more RGB cameras having other fields of view. For example, image sensor 110 may include one or more RGB cameras having a field of view of at least 135 degrees or at least 150 degrees. The RGB camera may be configured to detect color information associated with elements within range of the camera (e.g., within the field of view of the camera). Images captured by the RGB camera may additionally be processed (e.g., using object recognition, edge detection, or color analysis) in order to distinguish objects within the presentation environment.

Image sensor 110 may additionally or alternatively (e.g., in addition/alternatively to the RGB camera(s)) include one or more depth cameras. When included, the depth camera(s) may incorporate any suitable depth sensing mechanism and associated elements (e.g., light projectors), including but not limited to structured light, time of flight, stereoscopy, etc. For example, image sensor 110 may include an infrared camera and associated infrared light projector. As illustrated in FIG. 1, a depth camera may have a field of view ($\alpha$) that is configured and/or sized/positioned to capture at least the display (e.g., the entire display) on which a presentation is presented. The field of view of the depth camera may additionally be configured and/or sized/positioned to capture the display and areas to the side of the display in which the presenter may be expected to reside during a presentation. In some examples, the depth camera may have a field of view of approximately 80 degrees. In other examples, the depth camera may have a field of view that is greater than 70 degrees. In still other examples, the depth camera may have a field of view that is greater than or equal to 80 degrees. When both a depth camera and an RGB camera are included in the image sensor, the depth camera may have a smaller field of view than the RGB camera.

The depth camera may be configured to generate a depth image of the presenter 102 and/or other elements in the presentation environment 100. As described in more detail below, the depth camera may be utilized (e.g., alone or in combination with the RGB camera) to differentiate pixels of one or more image frames that correspond to a presenter from pixels of the one or more image frames that correspond to other elements in the presentation environment and/or the background of the presentation environment.

The presenter 102 may interact with the presentation and/or participants of the presentation. Although a single presenter is depicted in FIG. 1, it is to be understood that two or more presenters may interact with the presentation. Furthermore, the presenter may change from a first presenter to a second/third/etc. presenter over the course of the presentation. As described in more detail below with respect to FIG. 2, throughout the presentation, the image sensor 110 may image the presenter(s) (e.g., interacting with the displayed presentation) and transmit the image data to the computing device 108. The computing device 108 may analyze the image data, extract the presenter from the image frames, and overlay the extracted presenter onto the presentation. The overlay performed by the computing device 108 may be used to modify the presentation file (e.g., to generate an updated presentation file) to include the extracted presenter image as an overlay onto displayable portions (e.g., slides) of the presentation. For example, the computing device 108 may update the presentation file to include a modification to a slide that is currently displayed on display device 106. The modification may include overlaying an image and/or live/recorded feed of the presenter over the slide.

The presentation may be provided to one or more remote participants to allow remote collaboration with the presentation. For example, the computing device 108 may transmit (e.g., via a network interface 111) the modified version of the presentation file to one or more remote participant devices 112 via a network 114. In this way, the remote participants may be able to view the same presentation as the local participants, with the presenter overlaid on top of the presentation. In examples where the native presentation file includes a plurality of slides, the updated presentation file that is transmitted to the remote participant device may include a plurality of slides with adjusted images of the presenter overlaid thereon. In this way, the updated presentation file that is transmitted to the remote participant is not simply a video or video feed of the presenter and/or presentation, but rather may be of the same file type as the native presentation file used to display the presentation locally to the presenter (e.g., on the display device in the presenter's presentation environment).

Figure 2:
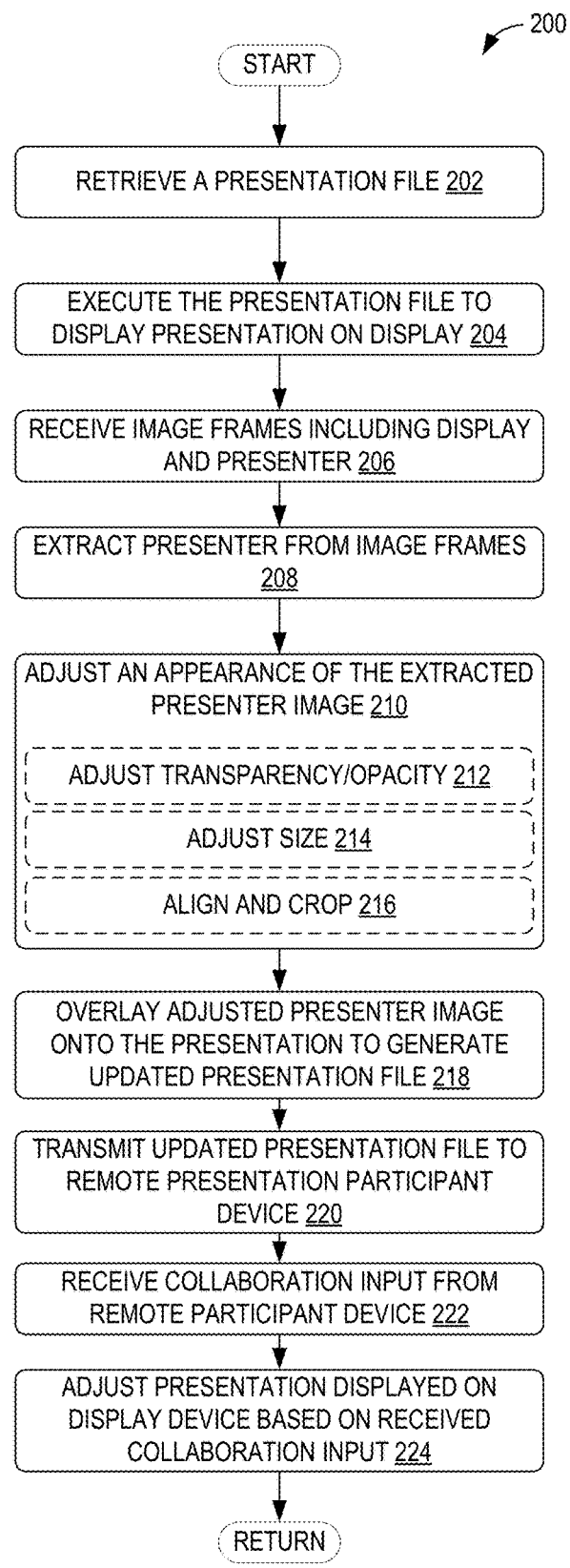
FIG. 2 is a flow chart of an example method of providing a collaborative presentation.

FIG. 2 is a flow chart of a method 200 for providing a collaborative presentation to a remote participant. For example, method 200 may be performed by computing device 108 of FIG. 1. At 202, method 200 includes retrieving a presentation file that is executable to display a presentation on a display device. For example, the presentation file may be stored on a storage device local to the computing device and/or a storage device coupled to the computing device via a network (e.g., a server or cloud storage device). At 204, the method includes executing the presentation file to display the presentation on the display device. For example, the presentation file may include a plurality of presentation slides or other displayable units of the presentation. When executed, a first slide or other displayable unit of the presentation/presentation file may be displayed.

Figure 3:
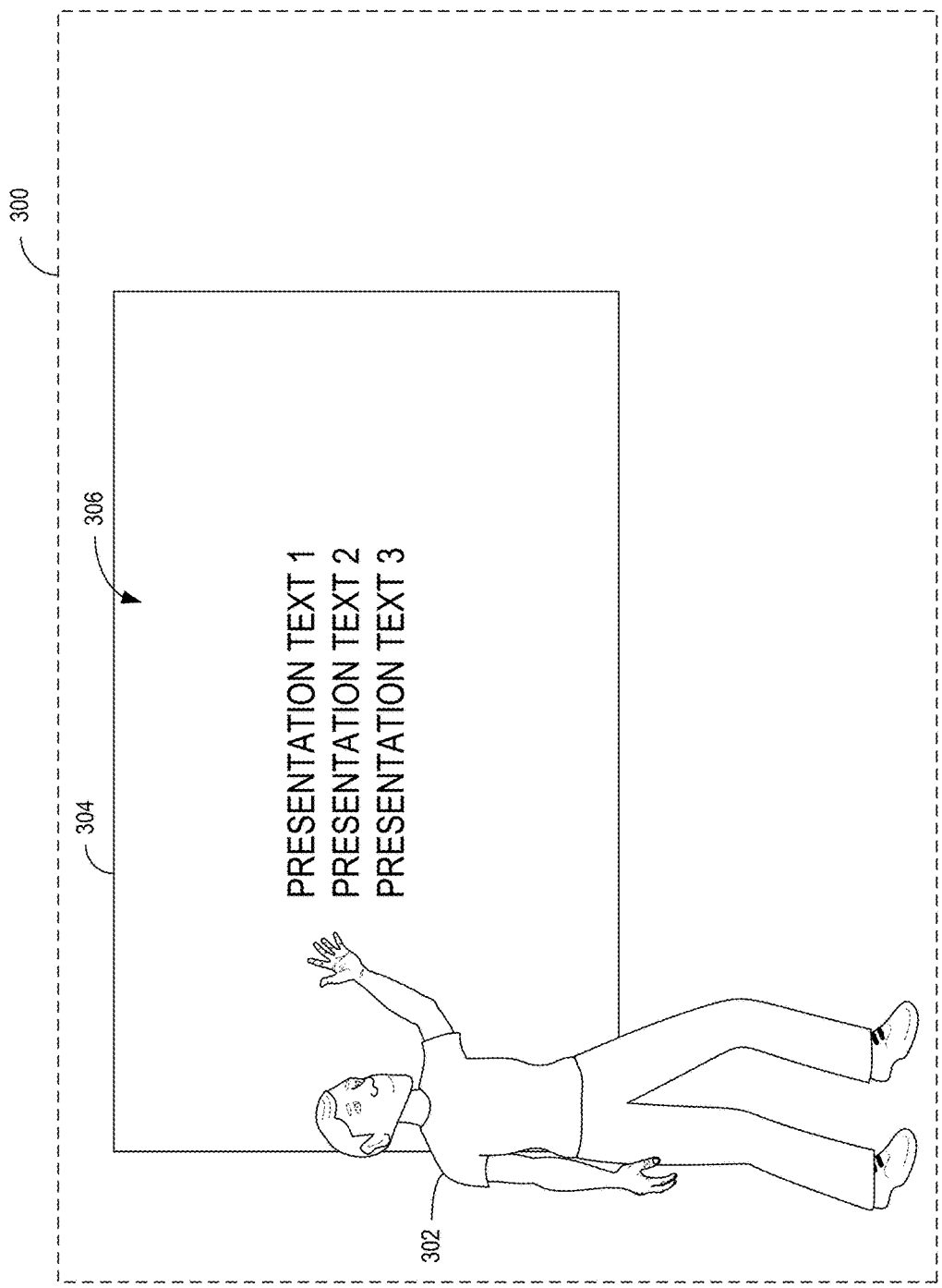
FIG. 3 shows an example image frame capturing a presenter, a display device, and a displayed presentation.

At 206, method 200 includes receiving, from an image sensor (e.g., image sensor 110 of FIG. 1), image frames including images of the display device, the displayed presentation, and a presenter. For example, the image sensor may be positioned as illustrated in FIG. 1 to image the presenter and the display device that is displaying the presentation. In this way, the presenter may be between the image sensor and the display device/displayed presentation. As described above, the received image frames may include depth images and/or RGB images from respective imaging devices. Turning briefly to FIG. 3, an example image frame 300 is shown. Example image frame 300 includes an image of a presenter 302, an image of a display device 304, and an image of a presentation 306 as displayed on display device 304.

Figure 4:
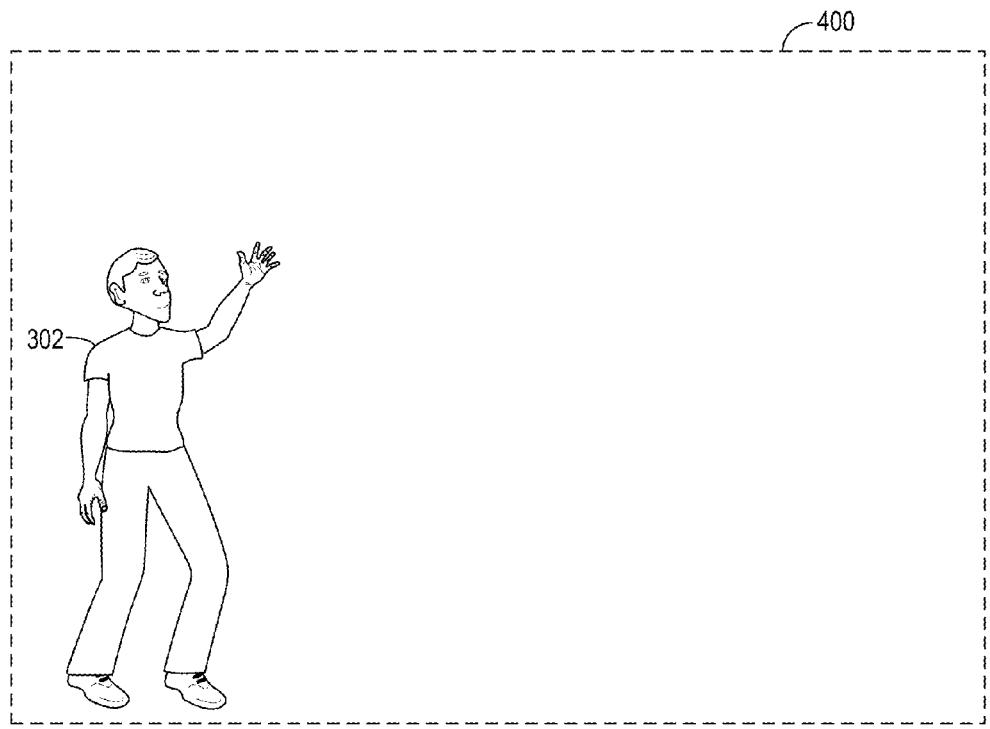
FIG. 4 shows an example extracted presenter image.

Returning to FIG. 2, method 200 includes extracting the presenter from the image frames to generate an extracted presenter image, as indicated at 208. For example, the computing device may perform object recognition, edge analysis, color analysis, and/or any other suitable mechanism or combination of mechanisms for differentiating pixels of the image frames that correspond to the presenter (302) from pixels of the image frames that do not correspond to the presenter (e.g., that correspond to other objects in the environment/scene and/or a background of the environment/scene). In some examples, depth and/or RGB image data may be utilized to differentiate the pixels of the presenter from the background pixels, and RGB image data may be utilized to provide an RGB overlay onto a depth image of the extracted presenter. In this way, the depth image data (in combination with RGB image data in some examples) may be used to distinguish the presenter from other elements in the image, and the RGB data may be utilized to match the extracted presenter image to a visible appearance of the presenter (e.g., rather than a depth image, which may not match the appearance of the presenter as viewed by the local participants of the presentation). The extracted presenter image may include one or more portions of the presenter, such as the face of the presenter (e.g., in order to provide a view of facial expressions of the presenter). Turning now to FIG. 4, an extracted presenter image 400 is illustrated. As shown, the extracted presenter image 400 includes the image of the presenter 302 from the image frame 300 of FIG. 3, but does not include the images of the display device 304 or the presentation 306 from the image frame 300 of FIG. 3. Areas of the extracted presenter image 400 that do not correspond to the presenter may be fully transparent. In other examples, the extracted presenter image comprises only the image of the presenter (e.g., has boundaries that are the same as the outline of the image of the presenter).

Figure 5:
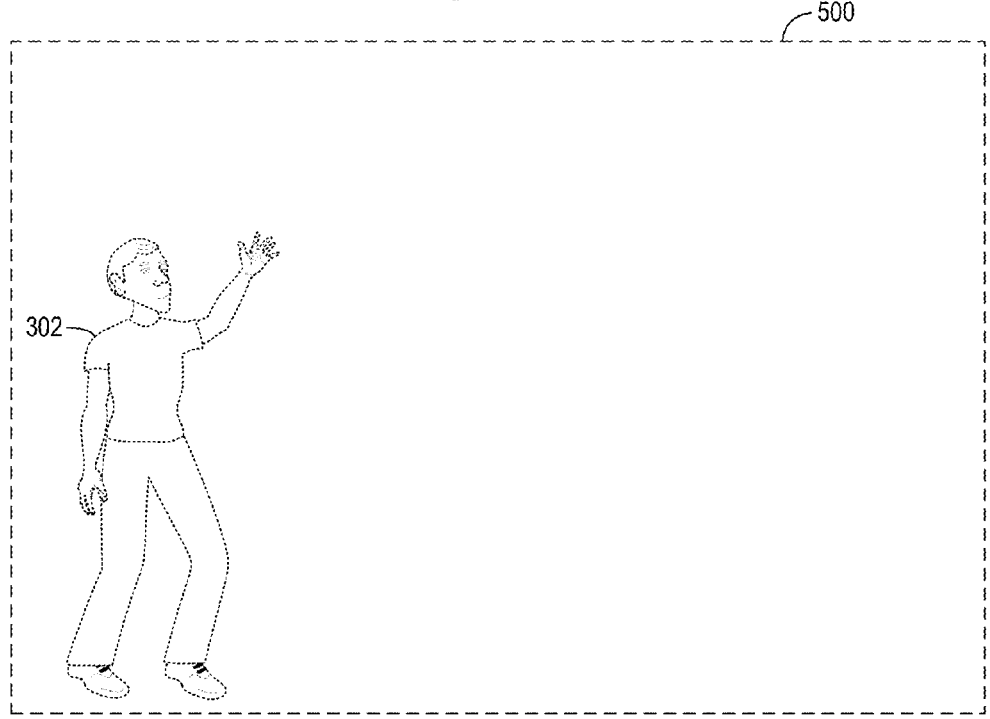
FIG. 5 shows an example adjusted presenter image.

Returning to FIG. 2, method 200 includes adjusting an appearance of the extracted presenter image to form an adjusted presenter image, as indicated at 210. For example, the adjustment may include increasing a transparency/decreasing an opacity of the presenter, as indicated at 212. Increasing the transparency/decreasing the opacity of the presenter may be performed in order to allow portions of the presentation that may be obscured by the presenter to pass through the adjusted presenter image once the adjusted presenter image is overlaid onto the presentation, as described in more detail below. Turning briefly to FIG. 5, an example adjusted presenter image 500 is shown. For example, the dashed lines of the image of the presenter 302 may signify that the image has a higher level of transparency (e.g., a lower level of opacity) than the original captured image of the presenter 302 (e.g., as shown in FIGS. 3 and 4). For example, the extracted presenter image 400 of FIG. 4 may represent the image of the presenter having 0% transparency, while the adjusted presenter image 500 of FIG. 5 may represent the image of the presenter having 70% transparency. It is to be understood that any transparency/opacity value may be utilized to adjust the extracted image of the presenter. Returning to FIG. 2, other adjustments may be performed in addition to or as an alternative to the transparency/opacity adjustment. For example, the size of the extracted presenter image may be adjusted, as indicated at 214. The extracted presenter image may also be aligned to the displayed presentation based on the image data of the image frame and/or cropped, as indicated at 216. For example, the extracted presenter image may be cropped such that the boundaries/borders of the adjusted presenter image match the outline/boundaries/borders of the presenter as imaged. The extracted presenter image may additionally or alternatively be cropped such that only a portion of the presenter that overlaps a region of the display device/presentation (or is within a threshold pixel and/or real-world distance of the display device and/or presentation) is included in the adjusted presenter image. Such cropping may occur during the adjustment of the appearance of the extracted presenter image at 210 and/or after overlaying the adjusted presenter image at 218 (described in more detail below).

Figure 6:
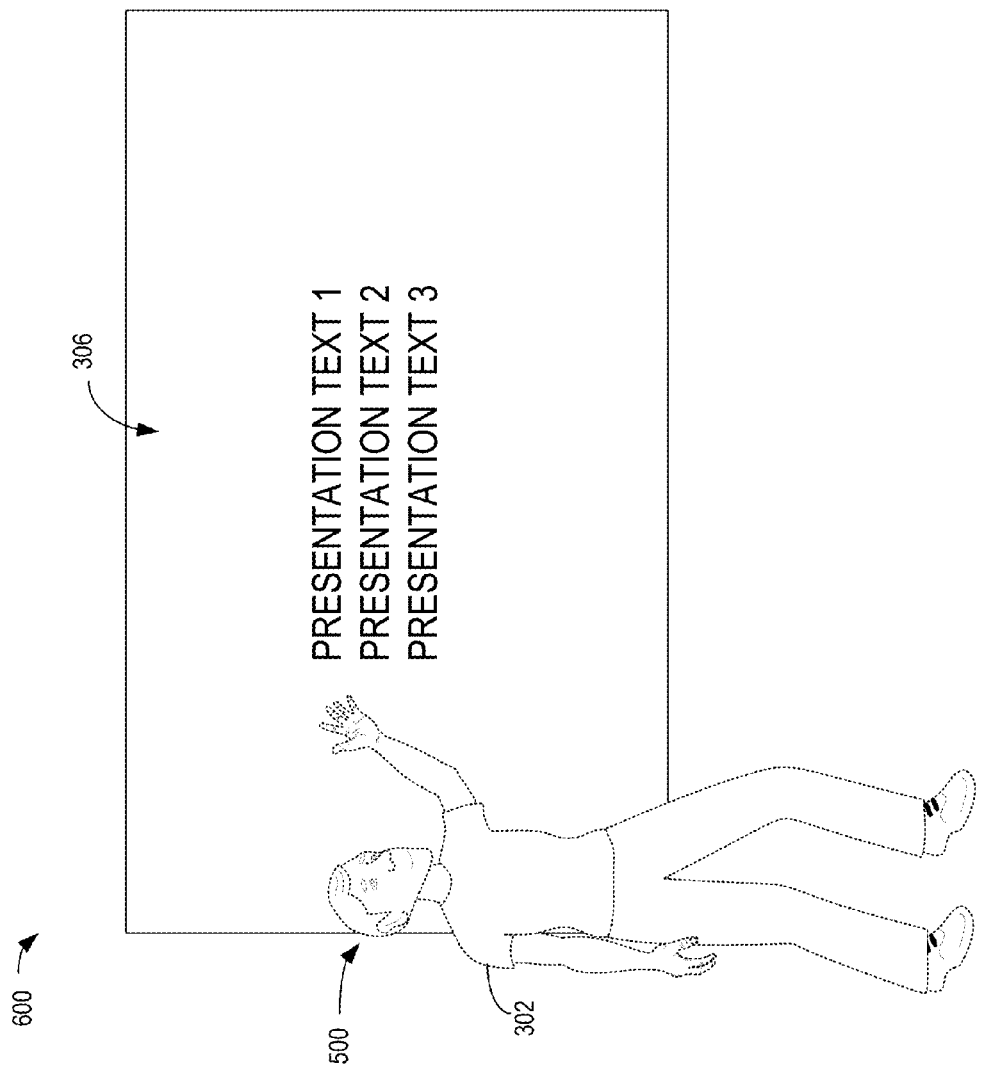
FIG. 6 shows an example presentation overlay including an adjusted presenter image overlaid onto a presentation.

At 218, the method 200 includes overlaying the adjusted presenter image onto the presentation to generate an updated presentation file. For example, the updated presentation file may be executable to display the presentation overlaid with the adjusted presenter image. In order to determine a location at which the adjusted presenter image is overlaid onto the presentation, the method may include aligning the extracted and/or adjusted presenter image with the presentation based on image frames from the image sensor. For example, the image frames may be analyzed by the computing device to determine a relative location of the presenter to the presentation as displayed on the display device. The analysis may include (e.g., a location of a hand of the presenter relative to a first letter of a title of the presentation). In this way, the presenter may be overlaid on the presentation such that the location of the presenter relative to the presentation in the modified presentation file matches the location of the presenter in the real-world presentation environment relative to the presentation displayed therein. FIG. 6 shows an example presentation overlay 600 in which an adjusted presenter image 500 of the presenter 302 is overlaid on a displayable element (e.g., a slide) of the presentation 306. For example, the adjusted presenter image 500 may be overlaid onto the native presentation from the native presentation file used to display the presentation on the display device 304 of FIG. 3. The updated presentation file may include the displayable elements of the native presentation file (e.g., slides of the native presentation file) with the adjusted presenter image 500 overlaid thereon.

As described above, the alignment and cropping indicated at 216 of FIG. 2 may be performed after the adjusted presenter image is overlaid onto the presentation. For example, the presentation overlay 600 shown in FIG. 6 may be cropped such that the boundaries of the presentation overlay match the boundaries of the presentation 306. Although described herein as being performed on the same computing device, it is to be understood that one or more of the image processing/adjustment mechanisms described herein may be performed off-board (e.g., at a remote device) from the computing device that provides the presentation to the local/remote participants in some embodiments.

Returning to FIG. 2, method 200 includes transmitting, via a network interface, the updated presentation file to a remote presentation participant device at 220. In method 200 and the examples described above, the remote presentation participant device will often be in a location other than in the room where the presenter is, though examples are possible in which the remote presentation participant device is in the same room (e.g., a personal device being used by one of local participants 204). In any case, method 200 further includes receiving collaboration input from the remote participant device at 222 and, at 224, adjusting the presentation as displayed on the display device based on the received collaboration input. For example, a remote participant may interact with the presentation by selecting a response on a poll of the presentation, which may cause the presentation displayed on the display device (e.g., local to the presenter) to update a poll result to reflect the participant's response. In another example, the remote participant may provide input to the remote participant device indicating that he/she has a question regarding the presentation. The indication of the outstanding question may be transmitted to and received by the computing device that controls the display of the presentation local to the presenter. In response to the indication of the outstanding question, the computing device may update the displayed presentation to provide a visual and/or audible indication of the question to the presenter. These are but examples—a wide range of other inputs may be received from other devices in order to affect/control/adjust the presentation.

It is to be understood that the method 200 may be performed in real-time as a presentation is being presented by a presenter and/or continuously based on a recorded/live video feed of a presenter giving the presentation. For example, each image frame of such a video feed may be analyzed and processed as described above and utilized to generate an updated presentation file. The updated presentation file may be transmitted as a stream (e.g., presenting a substantially real-time, aside from network/processing delays, view of the presenter overlaid onto the native presentation) to the remote participant device in some examples. In other examples, the extracted and adjusted presenter images may be overlaid onto the presentation and stored as frames of the presentation. In such examples, the updated presentation file may include the frames of the presentation.

Figure 7:
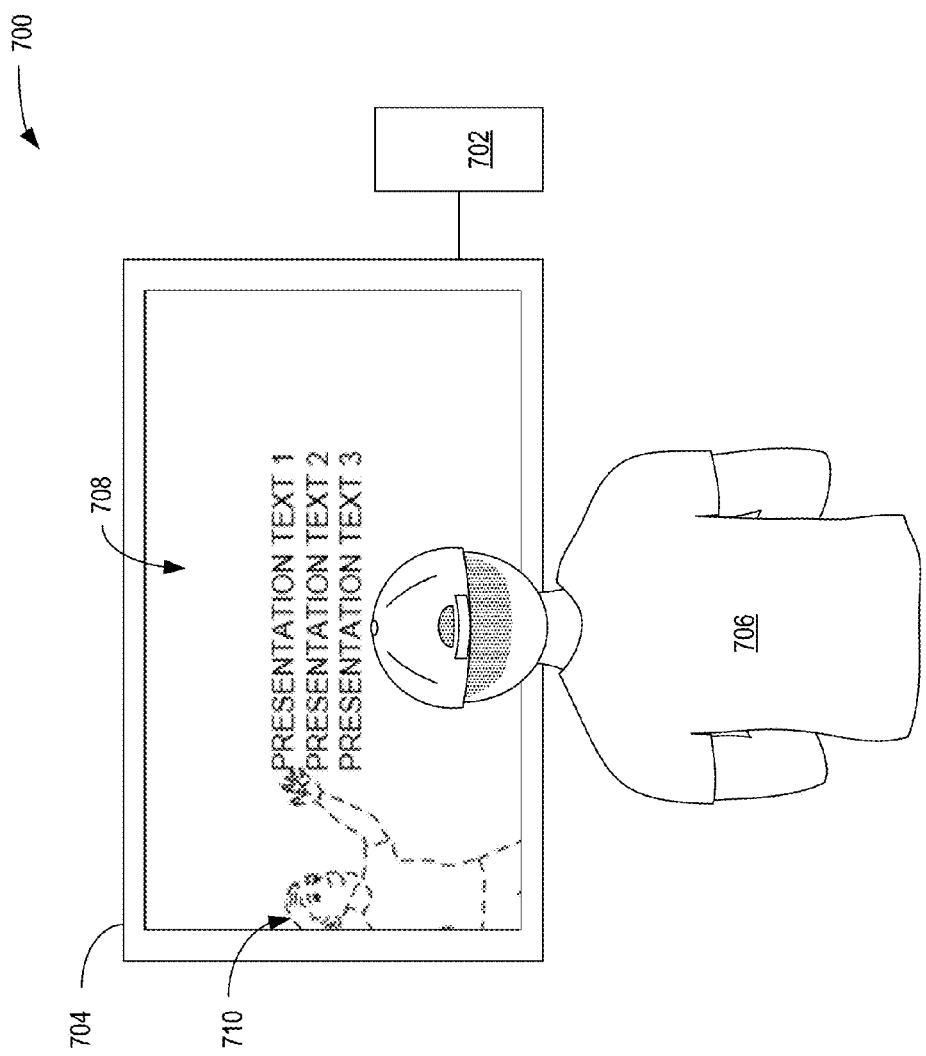
FIG. 7 shows an example remote presentation participant environment.

FIG. 7 shows an example remote participant environment 700 including a remote participant device 702 coupled to a remote participant display device 704. A remote participant 706 may view and/or interact with an updated presentation 708 (e.g., displayed based on an updated presentation file, such as the updated presentation file generated at 218 of FIG. 2) on the display device 704. For example, the updated presentation 708 may include a native presentation (e.g., the native presentation 306 of FIG. 3) presented locally to a presenter having an adjusted presenter image 710 overlaid thereon.

By providing such an updated presentation file to the remote participant device, the remote participant may view a presentation having the same quality as the presentation viewed by local participants, while also viewing body language, gestures, and/or facial expressions of the presenter that enhance how the presentation is experienced at other devices. For example, a high quality representation of the presenter is acquired via an image sensor (e.g., a depth imaging device and/or an RGB camera) using optimal exposure and optical settings to capture in-focus, well-exposed images that are not compromised by attempting to also capture high quality images of the presentation. Instead, the presentation that is transmitted/presented to the remote participant is ensured to have a high level of viewing quality by using the native presentation file and updating said native presentation file to include the images/video of the presenter as an overlay to displayable portions of the file. Furthermore, by adjusting an appearance of the overlaid presenter (e.g., increasing a transparency), full occlusion of the presentation by the presenter may be avoided while still allowing a remote participant to map presenter gestures and expressions to regions of the presentation.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
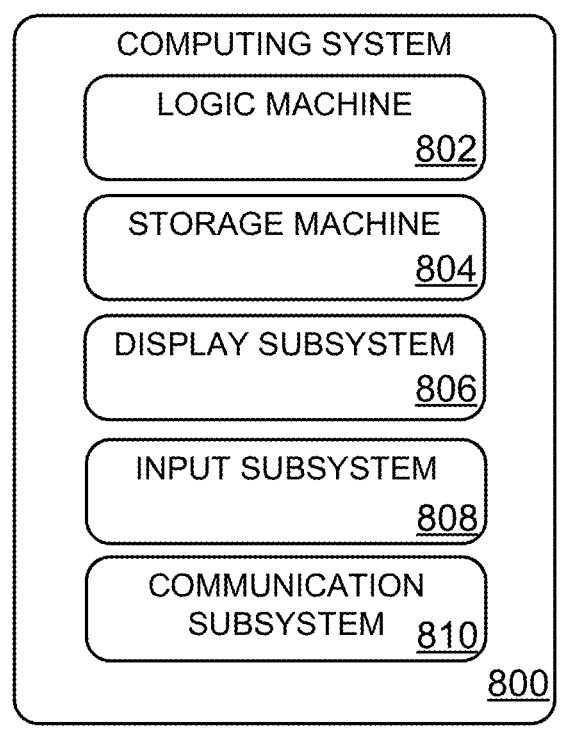
FIG. 8 is a block diagram of an example computing device.

FIG. 8 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices. For example, computing system 800 may correspond to computing device 108 and/or remote participant device 112 of FIG. 1

Computing system 800 includes a logic machine 802 and a storage machine 804. Computing system 800 may optionally include a display subsystem 806, input subsystem 808, communication subsystem 810, and/or other components not shown in FIG. 8.

Logic machine 802 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 804 includes one or more physical devices configured to hold instructions executable by the logic machine to implement the methods and processes described herein. When such methods and processes are implemented, the state of storage machine 804 may be transformed—e.g., to hold different data.

Storage machine 804 may include removable and/or built-in devices. Storage machine 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

It will be appreciated that storage machine 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 800 implemented to perform a particular function. In some cases, a module, program, or engine may be instantiated via logic machine 802 executing instructions held by storage machine 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 806 may be used to present a visual representation of data held by storage machine 804. This visual representation may take the form of a graphical user interface (GUI). As the herein described methods and processes change the data held by the storage machine, and thus transform the state of the storage machine, the state of display subsystem 806 may likewise be transformed to visually represent changes in the underlying data. Display subsystem 806 may include one or more display devices utilizing virtually any type of technology. Such display devices may be combined with logic machine 802 and/or storage machine 804 in a shared enclosure, or such display devices may be peripheral display devices.

When included, input subsystem 808 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

Another example provides a collaborative presentation system comprising a display device; an image sensor configured to image a region including the display device; a network interface; a logic device; and a storage device holding instructions executable by the logic device to: retrieve a presentation file that is executed to display a presentation on the display device; receive image frames from the image sensor, the image frames including the display device, the displayed presentation, and a presenter; extract the presenter from the image frames to generate an extracted presenter image; adjust an appearance of the extracted presenter image to form an adjusted presenter image, the adjustment including increasing a transparency of the extracted presenter image; generate an updated presentation file, the updated presentation file being executable to display the presentation overlaid with the adjusted presenter image; and transmit, via the network interface, the updated presentation file to a remote presentation participant device. In such an example, the instructions may additionally or alternatively be further executable to crop the adjusted presenter image to share boundaries of the presentation as displayed on the display device prior to overlaying the adjusted presenter image onto the presentation. In such an example, the image sensor may additionally or alternatively comprise a depth image sensor. In such an example, the image sensor may additionally or alternatively further comprise an RGB camera, and extracting the presenter may additionally or alternatively comprise generating a depth image of the presenter based on image data from the depth image sensor and overlaying the depth image with an RGB overlay based on image data from the RGB camera. In such an example, the image sensor may additionally or alternatively further comprise an RGB camera, a field of view of the RGB camera may additionally or alternatively be greater than a field of view of the depth camera, and the field of view of the RGB camera may additionally or alternatively be sized and positioned to capture at least the presenter and the display device and the field of view of the depth camera may additionally or alternatively be sized and positioned to capture at least the display device. In such an example, the presentation file may additionally or alternatively comprise a plurality of slides of the presentation, and the updated presentation file may additionally or alternatively comprise the adjusted presenter image overlaid onto one of the plurality of slides of the presentation file corresponding to a currently-displayed slide of the presentation. In such an example, extracting the presenter may additionally or alternatively comprise extracting a face of the presenter. In such an example, the instructions may additionally or alternatively be further executable to receive, via the network interface, collaboration input from the remote presentation participant device and adjust the presentation displayed on the display device based on the collaboration input. In such an example, overlaying the adjusted presenter image onto the presentation may additionally or alternatively comprise aligning the extracted presenter image with the presentation based on image frames from the image sensor. Any or all of the above-described examples may be combined in any suitable manner in various implementations.

Another example provides, on a collaborative presentation system, a method of providing a collaborative presentation, the method comprising: retrieving a presentation file that is executed to display a presentation on a display device; receiving, from an image sensor, image frames including images of the display device and a presenter; extracting the presenter from the image frames to generate an extracted presenter image; adjusting an appearance of the extracted presenter image to form an adjusted presenter image, the adjustment including increasing a transparency of the presenter; overlaying the adjusted presenter image onto the presentation to generate an updated presentation file, the updated presentation file being executable to display the presentation overlaid with the adjusted presenter image; and transmitting, via a network interface, the updated presentation file to a remote presentation participant device. In such an example, the method may additionally or alternatively further comprise cropping the adjusted presenter image as overlaid onto the presentation to share boundaries of the presentation as displayed on the display device. In such an example, the method may additionally or alternatively further comprise cropping the adjusted presenter image such that boundaries of the adjusted presenter image as overlaid onto the presentation are within a threshold of boundaries of the presentation. In such an example, adjusting the appearance of the extracted presenter image may additionally or alternatively further comprise adjusting a size of the extracted presenter image. In such an example, the image sensor may additionally or alternatively comprise a depth image sensor. In such an example, the image sensor may additionally or alternatively further comprise an RGB camera, and extracting the presenter may additionally or alternatively comprise generating a depth image of the presenter based on image data from the depth image sensor and overlaying the depth image with an RGB overlay based on image data from the RGB camera. In such an example, the presentation file may additionally or alternatively comprise a plurality of slides of the presentation, and the updated presentation file may additionally or alternatively comprise the adjusted presenter image overlaid onto one of the plurality of slides of the presentation file corresponding to a currently-displayed slide of the presentation. In such an example, extracting the presenter may additionally or alternatively comprise extracting a face of the presenter. In such an example, the method may additionally or alternatively further comprise receiving, via the network interface, collaboration input from the remote presentation participant device and adjusting the presentation displayed on the display device based on the collaboration input. In such an example, overlaying the adjusted presenter image onto the presentation may additionally or alternatively comprise aligning the extracted presenter image with the presentation based on image frames from the image sensor. Any or all of the above-described examples may be combined in any suitable manner in various implementations.

Another example provides a collaborative presentation system comprising: a display device; an image sensor configured to image a region including the display device; a network interface; a logic device; and a storage device holding instructions executable by the logic device to: retrieve a presentation file that is executed to display a presentation on the display device; receive image frames from the image sensor, the image frames including the display device and a presenter; extract the presenter from the image frames to generate an extracted presenter image; adjust an appearance of the extracted presenter image to form an adjusted presenter image, the adjustment including increasing a transparency of the presenter; align the adjusted presenter image with the presentation displayed on the display device based on the image frames; crop the adjusted presenter image such that the adjusted presenter image, as aligned with the presentation, shares boundaries with the presentation as displayed on the display device; overlay the cropped adjusted presenter image onto the presentation to generate an updated presentation file, the updated presentation file being executable to display the presentation overlaid with the cropped adjusted presenter image; and transmit, via the network interface, the updated presentation file to a remote presentation participant device. Any or all of the above-described examples may be combined in any suitable manner in various implementations.

The invention claimed is:

1. A collaborative presentation system comprising:
   a display device;
   an image sensor configured to image a region including the display device;
   a network interface;
   a logic device; and
   a storage device holding instructions executable by the logic device to:
   retrieve a presentation file that is executed to display a presentation on the display device, the presentation file including one or more displayable elements;
   receive a plurality of image frames from the image sensor, each image frame including an image of the display device, an image of a currently-displayed displayable element of the presentation, and an image of a presenter;
   for each image frame of the plurality of received image frames:
      extract the image of the presenter from the image frame to generate an extracted presenter image,
      adjust an appearance of the extracted presenter image to form an adjusted presenter image, and
      overlay the adjusted presenter image over the currently-displayed displayable element of the presentation, wherein adjusting the appearance of the extracted presenter image includes cropping the adjusted presenter image such that boundaries of the adjusted presenter image as overlaid onto the presentation are within a threshold distance of boundaries of the presentation or boundaries of the display;
   generate an updated presentation file, the updated presentation file being executable to display the one or more displayable elements of the presentation overlaid with each adjusted presenter image; and
   transmit, via the network interface, the updated presentation file to a remote presentation participant device.

2. The collaborative presentation system of claim 1, wherein adjusting the appearance of the extracted presenter image includes adjusting a transparency of the extracted presenter image.

3. The collaborative presentation system of claim 1, wherein adjusting the appearance of the extracted presenter image includes adjusting a size of the extracted presenter image.

4. The collaborative presentation system of claim 1, wherein the image sensor comprises a depth image sensor and an RGB camera, and where extracting the presenter comprises generating a depth image of the presenter based on image data from the depth image sensor and overlaying the depth image with an RGB overlay based on image data from the RGB camera.

5. The collaborative presentation system of claim 1, wherein the image sensor comprises a depth image sensor and an RGB camera, and wherein a field of view of the RGB camera is greater than a field of view of the depth camera, and wherein the field of view of the RGB camera is sized and positioned to capture at least the presenter and the display device and the field of view of the depth camera is sized and positioned to capture at least the display device.

6. The collaborative presentation system of claim 1, wherein the presentation file comprises a plurality of slides of the presentation, and wherein the updated presentation file comprises each of the adjusted presenter images overlaid onto an associated one of the plurality of slides of the presentation file corresponding to a currently-displayed slide of the presentation.

7. The collaborative presentation system of claim 1, wherein the instructions are further executable to receive, via the network interface, collaboration input from the remote presentation participant device and adjust the presentation displayed on the display device based on the collaboration input.

8. The collaborative presentation system of claim 1, wherein overlaying the adjusted presenter image onto the presentation comprises determining a relative location of the presenter to the presentation as displayed on the display device.

9. On a collaborative presentation system, a method of providing a collaborative presentation, the method comprising:
   retrieving a presentation file that is executed to display a presentation on a display device;
   receiving, from an image sensor, image frames including images of the display device and a presenter;
   extracting the presenter from the image frames to generate an extracted presenter image;
   adjusting an appearance of the extracted presenter image to form an adjusted presenter image;
   overlaying the adjusted presenter image onto the presentation to generate an updated presentation file, the updated presentation file being executable to display the presentation overlaid with the adjusted presenter image, wherein adjusting the appearance of the extracted presenter image includes cropping the adjusted presenter image such that boundaries of the adjusted presenter image as overlaid onto the presentation are within a threshold distance of boundaries of the presentation or boundaries of the display;
   transmitting, via a network interface, the updated presentation file to a remote presentation participant device;
   receiving, via the network interface, collaboration input from the remote presentation participant device; and
   adjusting the presentation as displayed on the display device based on the received collaboration input.

10. The method of claim 9, wherein transmitting the updated presentation file comprises transmitting the updated presentation file as a stream presenting a substantially real-time view of the presenter overlaid onto the presentation.

11. The method of claim 9, wherein adjusting the appearance of the extracted presenter image further comprises adjusting a size of the extracted presenter image.

12. The method of claim 9, wherein the image sensor comprises a depth image sensor.

13. The method of claim 12, wherein the image sensor further comprises an RGB camera, and where extracting the presenter comprises generating a depth image of the presenter based on image data from the depth image sensor and overlaying the depth image with an RGB overlay based on image data from the RGB camera.

14. The method of claim 9, wherein the presentation file comprises a plurality of slides of the presentation, and wherein the updated presentation file comprises the adjusted presenter image overlaid onto one of the plurality of slides of the presentation file corresponding to a currently-displayed slide of the presentation.

15. The method of claim 9, wherein extracting the presenter comprises extracting a face of the presenter.

16. The method of claim 9, wherein adjusting the appearance of the extracted presenter image includes adjusting a transparency of the extracted presenter image.

17. The method of claim 9, wherein overlaying the adjusted presenter image onto the presentation comprises determining a relative location of the presenter to the presentation as displayed on the display device by locating points of interest on the presenter and/or presentation and determining a difference between the locations of the points of interest.

18. A collaborative presentation system comprising:
   a display device;
   an image sensor configured to image a region including the display device;
   a network interface;
   a logic device; and
   a storage device holding instructions executable by the logic device to:
      retrieve a presentation file that is executed to display a presentation on the display device;
      receive plurality of image frames from the image sensor, each of the image frames including an image of the display device and an image of the presenter;
      for each image frame of the plurality of received image frames:
         extract the presenter from the image frames to generate an extracted presenter image;
         adjust an appearance of the extracted presenter image to form an adjusted presenter image;
         align the adjusted presenter image with a displayable element of the presentation that is displayed on the image of the display device in that image frame;
         crop the adjusted presenter image such that the adjusted presenter image, as aligned with the displayable element of the presentation, shares boundaries with the presentation as displayed on the display device;
         overlay the cropped adjusted presenter image onto the displayable element of the presentation that is displayed on the image of the display device in that image frame to generate an updated presentation file, wherein adjusting the appearance of the extracted presenter image includes cropping the adjusted presenter image such that boundaries of the adjusted presenter image as overlaid onto the presentation are within a threshold distance of boundaries of the presentation or boundaries of the display; and
         transmit, via the network interface, the updated presentation file to a remote presentation participant device, the updated presentation file being executable to display the presentation overlaid with each cropped adjusted presenter image.

19. A collaborative presentation system comprising:
a display device;
an image sensor configured to image a region including the display device, wherein the image sensor comprises a depth image sensor and an RGB camera;
a network interface;
a logic device; and
a storage device holding instructions executable by the logic device to:
  retrieve a presentation file that is executed to display a presentation on the display device, the presentation file including one or more displayable elements;
  receive a plurality of image frames from the image sensor, each image frame including an image of the display device, an image of a currently-displayed displayable element of the presentation, and an image of a presenter;
  for each image frame of the plurality of received image frames:
    extract the image of the presenter from the image frame to generate an extracted presenter image, wherein extracting the presenter comprises generating a depth image of the presenter based on image data from the depth image sensor and overlaying the depth image with an RGB overlay based on image data from the RGB camera,
    adjust an appearance of the extracted presenter image to form an adjusted presenter image, and
    overlay the adjusted presenter image over the currently-displayed displayable element of the presentation;
  generate an updated presentation file, the updated presentation file being executable to display the one or more displayable elements of the presentation overlaid with each adjusted presenter image; and
  transmit, via the network interface, the updated presentation file to a remote presentation participant device.

* * * * *